United States Patent [19]
Yasuda et al.

[11] Patent Number: 5,938,972
[45] Date of Patent: Aug. 17, 1999

[54] LIQUID CRYSTAL COMPOSITION, PRODUCTION THEREOF, AND LIQUID CRYSTAL ELEMENT MADE THEREWITH

[75] Inventors: Akio Yasuda, Tokyo; Eriko Matsui, Kanagawam, both of Japan

[73] Assignee: Sony Corporation, Tokyo, Japan

[21] Appl. No.: 08/859,272

[22] Filed: May 20, 1997

[30] Foreign Application Priority Data

May 20, 1996 [JP] Japan ................................. 8-148716

[51] Int. Cl.$^6$ .......................... C09K 19/52; C09K 19/54
[52] U.S. Cl. ................................ 252/299.01; 252/299.5; 252/299.6
[58] Field of Search ........................ 252/299.5, 299.6, 252/299.01, 299.61

[56] References Cited

U.S. PATENT DOCUMENTS 5,178,792  1/1993  Harada et al. ..................... 252/299.6

FOREIGN PATENT DOCUMENTS

| 0 429 662 A1 | 6/1991 | European Pat. Off. . |
| 0 451 822 A2 | 10/1991 | European Pat. Off. . |
| 42 40 821 A1 | 6/1994 | Germany . |
| 6-321883 | 11/1994 | Japan . |
| 9-95418 | 4/1997 | Japan . |

OTHER PUBLICATIONS

WPIDS 97–267687, 1997.
Velho et al., "Viscosity of Nematic Mixtures: a free volume approach", Liq. Cryst. 5(1), 349–57, 1989.

*Primary Examiner*—Shean C. Wu
*Attorney, Agent, or Firm*—Hill & Simpson

[57] ABSTRACT

Disclosed herein are a liquid crystal composition which has a low viscosity and exhibits a high response speed while keeping the characteristic properties (e.g., orientation and switching performance) required of liquid crystal materials, a liquid crystal element based on said liquid crystal composition, and a process for producing said liquid crystal composition. The liquid crystal composition contains a clathrate compound of liquid crystal molecules with cyclodextrin or a derivative thereof. The clathrate compound functions to increase the free volume of liquid crystal molecules. The liquid crystal composition is prepared by dissolving in a solvent a liquid crystal and cyclodextrin (or a derivative thereof), thereby forming a clathrate compound and adding this clathrate compound to a base liquid crystal material.

13 Claims, 18 Drawing Sheets

Schematic of cyclodextrin

Schematic of partly methylated cyclodextrin
(PMCD)

Chiral molecules :

(1)

Cr 44°C  N  50°C  Iso (2)

Cr 28°C  N  42°C  Iso

C8LPS/CD clathrate compound

FIG. 6
Achiral molecules (base material):
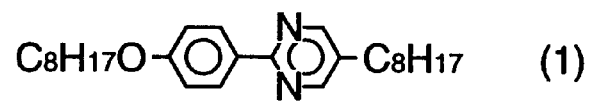  (1)
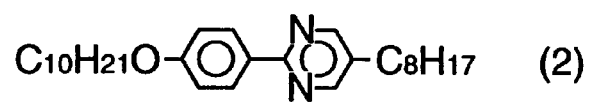  (2)
FIG. 7
Phase and phase transition temperature
System without clathration:
Sm   39.8°C   N   118.9°C   Iso
System with clathration:
Sm   39.5°C   N   118.2°C   Iso

FIG. 10

Phase and phase transition temperature :

System without clathration :

$$\text{Iso} \xrightarrow{66} \text{N}^* \xrightarrow{62.5} \text{SmA} \xrightarrow{53} \text{SmC}^* \xrightarrow{14°C} \text{Cr}$$

System with clathration :

$$\text{Iso} \xrightarrow{65.7} \text{N}^* \xrightarrow{62.9} \text{SmA} \xrightarrow{53} \text{SmC}^* \xrightarrow{14°C} \text{Cr}$$

Temperature dependence of response time
C8LPS

Pulse width vs. concentration of clathrate compound in base liquid crystal FLC

Contrast vs. concentration of clathrate compound in base liquid crystal FLC

Response time vs. concentration of clathrate compoud in base liquid crystal

LIQUID CRYSTAL COMPOSITION, PRODUCTION THEREOF, AND LIQUID CRYSTAL ELEMENT MADE THEREWITH

BACKGROUND OF THE INVENTION

1. Field of the Invention

The present invention relates to a liquid crystal composition (suitable for liquid crystal display elements), a process for production thereof, and a liquid crystal element (such as a liquid crystal display element) made therewith.

2. Description of the Related Art

Among liquid crystal materials used for liquid crystal display elements is a ferroelectric liquid crystal (FLC) which functions through the switching effect of the chiral smectic C phase (SmC* phase). It is attracting attention recently.

The FLC display is characterized by (1) quick response (1000 times as fast as the conventional nematic liquid crystal display), (2) less dependence on the viewing angle, and (3) image's memory function.

There is another liquid crystal attracting attention. It is a nematic liquid crystal which functions through the switching effect of the nematic phase (N phase). It is widely used for displays of various modes, such as twisted nematic mode (in-plane mode) with active matrix drive by thin film transistors (TFT), supertwisted nematic mode with simple matrix drive, guest-host mode with a dichroic dye, electrically-controlled birefringence (ECB) mode due to the effect of birefringence, dynamic scattering (DSM) mode, phase transition mode, and polymer dispersion mode.

There have hitherto been synthesized a variety of liquid crystal molecules which exhibit the ferroelectric properties. Such liquid crystals (FLC) were designed to reduce the response time (or increase the response speed). A conceivable means to achieve this object is to increase the spontaneous polarization (Ps) and decrease the viscosity in view of the fact that the response time ($\tau$) of FLC is defined by $\tau=\eta/Ps\cdot E$, where $\eta$ is the viscosity of the material, Ps is the spontaneous polarization, and E is the electric field.

On the other hand, in the case of nematic liquid crystal, a conceivable means to reduce the response time (or increase the response speed) is to increase the dielectric constant and reduce the viscosity in view of the fact that the response time ($\tau$) of nematic liquid crystal is defined by:

$$\tau_{on}=\lambda\cdot d^2/\epsilon_0\epsilon_a(V^2-V_c^2)$$

$$\tau_{off}=\lambda\cdot d^2/\pi^2 K$$

where $\tau_{on}$ is the rise time, $\tau_{off}$ is the breaking time, $\lambda$ is the viscosity, d is the cell gap, K is the elastic constant, and $V_c$ is the threshold voltage.

Liquid crystal display systems usually obey the above-mentioned equations as far as their response speed is concerned. However, with increased spontaneous polarization (Ps), they have difficulties with depolarization field that occurs in the liquid crystal display panel or disturbance of molecular orientation due to adsorption of impurity ions in the cell. In addition, increasing the dielectric constant poses problems with adsorption of impurity ions, sticking that occurs in the liquid crystal display panel, and disturbance of molecular orientation. The result is a speed lower than excepted or an insufficient contrast leading to a poor image quality. Because of this, it seems questionable to unduly increase the spontaneous polarization and dielectric constant.

One way now under study to decrease the viscosity of FLC and to increase the temperature range of FLC is to use achiral molecules (having no spontaneous polarization) and chiral molecules (having spontaneous polarization) in combination, with the former being as a base material and the latter being as a dopant, instead of using the former alone. (This is referred to as dopant method). In this case, however, the base material dominates in amount (concentration) over the dopant and hence affects the viscosity and temperature range.

Despite the foregoing, apparently it is chiral molecules having spontaneous polarization which governs the response of FLC to the electric field and determines the characteristic properties of FLC displays.

The above-mentioned equation has been used as a guide to selecting an adequate material from the standpoint of response speed; however, some consider it questionable after the discovery of many systems not conforming to it. In addition, there is no guide to selecting an adequate material from the standpoint of display contrast.

Another disadvantage of the FLC element is great dependence on temperature for switching. (This dependence is one order of magnitude greater than that of twisted nematic liquid crystal). This disadvantage must be overcome before the FLC element is put to practical use.

The viscosity of liquid crystal decreases with increasing temperature, resulting in the latching pulse width (or the pulse width to produce the memory effect) decreasing and the threshold voltage also decreasing simultaneously. (The threshold voltage depends on the latching pulse width.) Conversely, the viscosity of liquid crystal increases with decreasing temperature, resulting in the latching pulse width increasing and the threshold voltage increasing. It follows therefore that the temperature dependence of threshold voltage can be best avoided by eliminating the temperature dependence of viscosity. This is an effective way of approaching from the standpoint of material.

A conventional way to decrease viscosity was by introduction of a fluorine atom to the asymmetric carbon atom of the chiral molecule (as reported by Nohira et al. of Saitamo University). The modification of molecular structure, however, will make it difficult to meet a variety of requirements for display (such as contrast, response speed, bias stability, temperature range, temperature characteristics, and liquid crystal orientation).

In the case of nematic crystal liquid, a common way to decrease viscosity is by blending rather than the modification of molecular structure. However, blending still has difficulties in meeting the above-mentioned requirements.

A conceivable efficient way of material development is to pick up a material having good properties except for temperature characteristics and response speed and to make improvement on response speed.

OBJECT AND SUMMARY OF THE INVENTION

It is an object of the present invention to provide a liquid crystal composition, a process for production thereof, and a liquid crystal element made therewith, said liquid crystal composition being characterized by high response speed (due to low viscosity), low temperature dependence of threshold voltage, and high contrast (with low hysteresis or sticking), without adverse effect on the orientation and switching properties generally required of liquid crystals.

A possible parameter that affects the viscosity of a liquid crystal composition is the intermolecular action. Consequently, the object of decreasing the viscosity would be effectively achieved by increasing the free volume (in which molecules move freely). This is supported by the fact that a liquid crystal decreases in viscosity if its molecule has a substituent group (such as fluorine atom) attached to its core in the direction of its short axis, as reported in Asia Display, 1995 Proceedings, p. 65–68. In addition, there is a relationship between viscosity and free volume which is represented by equation below as reported in J. Appl. Phys., 22, 1471 (1951), 23,236 (1952).

$$\log \eta = \log A + B(V_o/V_f)$$

(where A and B are constants which depend on the individual liquid crystals, $V_o$ is the volume occupied by the molecule, and $V_f$ is the free volume.)

The present inventors studied a variety of substances which, when added to liquid crystals, increase the free volume through formation of a clathrate compound. An example of such substances is cyclodextrin. The results of this study led to the present invention.

The gist of the present invention resides in a liquid crystal composition which comprises a liquid crystal compound (in the form of chiral molecules) and a substance (such as cyclodextrin or a derivative thereof) incorporated therein to increase the free volume thereof through clathration therewith.

The present inventors found that a liquid crystal compound has its free volume between molecules increased by clathration with a dextrin derivative (which is known to form a clathrate compound with a variety of compounds) and that the increased free volume leads to a decrease in viscosity and a remarkable increase in response time and also to a reduction in hysteresis (sticking) owing to weakened interaction between the liquid crystal molecule and the alignment layer.

Clathration of ferroelectric liquid crystal chiral molecules increases their free volume, thereby decreasing their mutual action and hence viscosity. The decreased viscosity leads to a high-speed response. In addition, clathration remarkably decreases the temperature dependence of the threshold voltage and also improves the bias stability required of simple matrix drive (which leads to a higher contrast).

According to the present invention, the liquid crystal composition may be produced by dissolving in a solvent a liquid crystal compound and a substance to increase the free volume of the molecule of the liquid crystal compound, thereby forming a desired clathrate compound.

BRIEF DESCRIPTION OF THE DRAWINGS

FIG. 6 shows the structural formula of achiral molecules (as the base material).

FIG. 7 shows the phase transition and phase transition temperature of the liquid crystal composition.

FIG. 10 shows the phase transition and phase transition temperature of the ferroelectric liquid crystal composition.

DESCRIPTION OF THE PREFERRED EMBODIMENTS

According to the present invention, the liquid crystal composition should contain the liquid crystal in the form of clathrate compound with said substance and should be prepared by incorporating the liquid crystal compound with said substance for clathration.

According to the present invention, the ferroelectric liquid crystal compound should be composed of chiral molecules and achiral molecules, either or both of them forming a clathrate compound with said substance. Such a liquid crystal compound should be prepared by adding said substance for clathration.

The clathrate compound in the present invention should have an alkyl chain which is longer (along the long axis of the liquid crystal molecule) than the molecule (along its long axis) of said substance. Clathration should take place in such a manner that the alkyl chain projects from one opening of the clathrating lattice of said substance and at least part of the aromatic rings of the liquid crystal molecule overlaps with the other opening of the clathrating lattice.

To form said clathrate compound, it is desirable to add at least one kind selected from the group consisting of cyclodextrins, crown ethers, cyclophanes, and derivatives thereof.

The clathrate compound should usually be contained in an amount of 0.1–50 wt %. With an excessively small content, it does not produce the effect of increasing the free volume; with an excessively large content, it has an adverse effect on the performance of the liquid crystal composition.

With incorporation with said substance to increase the free volume of constituent molecules, the liquid crystal composition of the present invention can be used to form a liquid crystal element (such as FLC display), in which it is disposed between a pair of opposing substrates a certain gap apart, each substrate having an electrode layer and an aligning layer formed consecutively thereon.

The liquid crystal composition of the present invention will be described in more detail by reference to an example in which cyclodextrin is used for clathration.

Figure 1A:
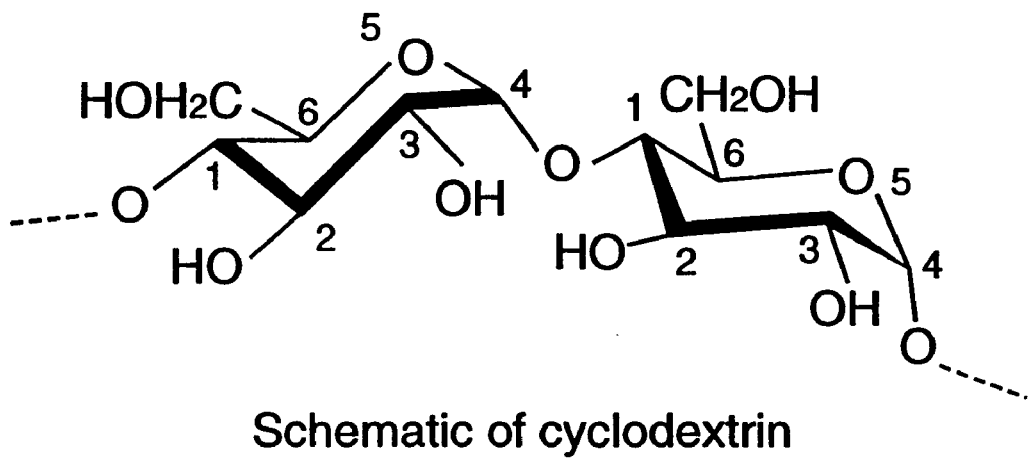
FIG. 1 is a schematic representation of cyclodextrin and a derivative thereof to form the clathrate compound contained in the ferroelectric liquid crystal composition of the present invention.

Cyclodextrin has a molecular structure resembling a truncated cone with open ends. It is a cyclic compound consisting of glucopyranose rings which form a hydrophobic cavity, as shown in FIG. 1A. It is called α-cyclodextrin, β-cyclodextrin, λ-cyclodextrin, or δ-cyclodextrin in correspondence to 6, 7, 8, or 9 glucopyranose rings. Table 1 below shows the physical properties of these cyclodextrins.

TABLE 1

Physical properties of cyclodextrins

|  |  | α-cyclo-dextrin | β-cyclo-dextrin | γ-cyclo-dextrin | δ-cyclo-dextrin |
|---|---|---|---|---|---|
| Number of glucose groups |  | 6 | 7 | 8 | 9 |
| Molecular weight (calculated) |  | 972 | 1135 | 1297 | 1459 |
| Water solubility (g/100 ml) |  | 14.5 | 1.85 | 23.2 | readily soluble |
| Angle of rotation $[\alpha]_D^{25}$ |  | 150.5 ± 0.5 | 162.5 ± 0.5 | 177.4 ± 0.5 | 191 ± 3 |
| Size of cavity (Å) | Inside dia. | 4.5 | ~7.0 | ~8.5 | — |
|  | Depth | 6.7 | ~7.0 | ~7.0 | — |

Figure 1B:
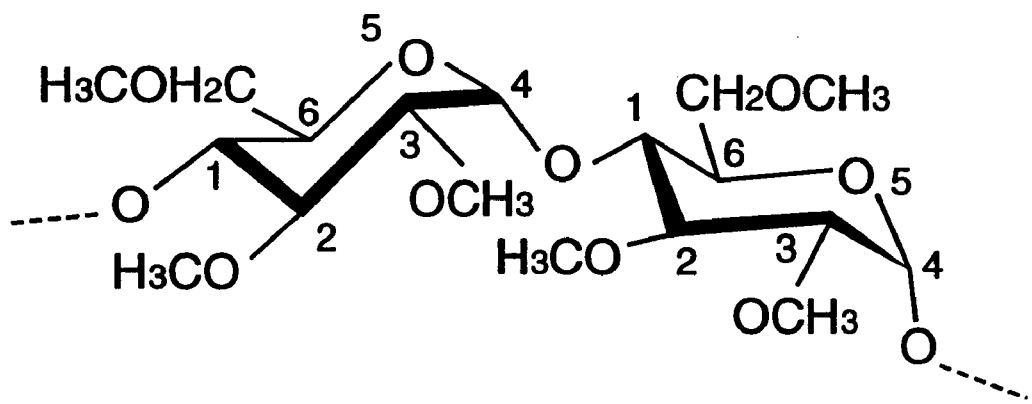

In the present invention, the cyclodextrins' disadvantage of being poor in water solubility is overcome by the use of partly methylated β-cyclodextrin (PMCD) shown in FIG. 1B which is available from Sanraku Co., Ltd. This cyclodextrin derivative is suitable because of its high solubility as shown in Table 2 below.

TABLE 2

Physical and chemical properties of β-cyclodextrin and methylated β-cyclodextrins

|  | PMCD | β-CD | Dimethyl β-CD | Trimethyl β-CD |
|---|---|---|---|---|
| Rate of methylation (%) | 69.9 | 0 | 66.7 | 100 |
| Specific rotation $[\alpha]_D^{25}$ (C = 1, H$_2$O) | +160.0 | +162.5 | +160.0 | +158.0 |
| Water solubility (g/100 ml, 25° C.) | 165 | 1.85 | 55 | 30 |
| Surface tension * (dyne/cm, 20° C.) | 58.8 | 67.8 | 61.0 | 55.9 |

* Value of 0.1 mM solution

Figure 2:
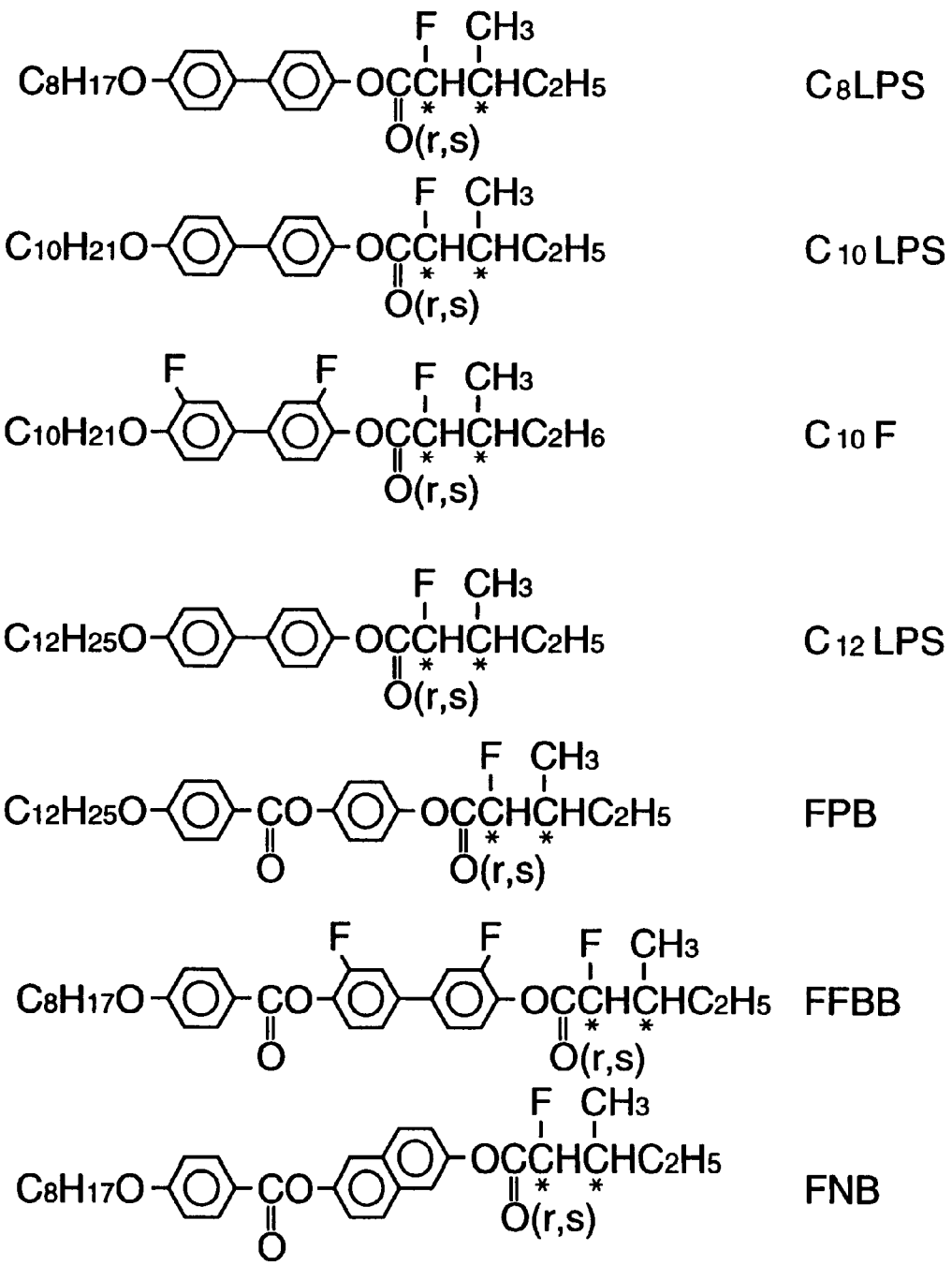
FIG. 2 shows the structural formulas of chiral liquid crystal molecules.

It is necessary that the liquid crystal molecule to be clathrated have a functional group that fits in the cavity of cyclodextrin. A desirable structure of the liquid crystal molecule is a rod-like one as shown in FIG. 2 (chiral molecules) or FIG. 3 (twist nematic liquid crystal molecules), rather than the one in which substituent groups extends in the direction of the short axis of the molecule. In other words, this structure is free of groups (such as fluorine atoms) which cause steric hindrance but possesses lipophilic groups highly compatible with cyclodextrin. Therefore, the liquid crystal molecule of this structure readily forms the clathrate compound.

Figure 3:
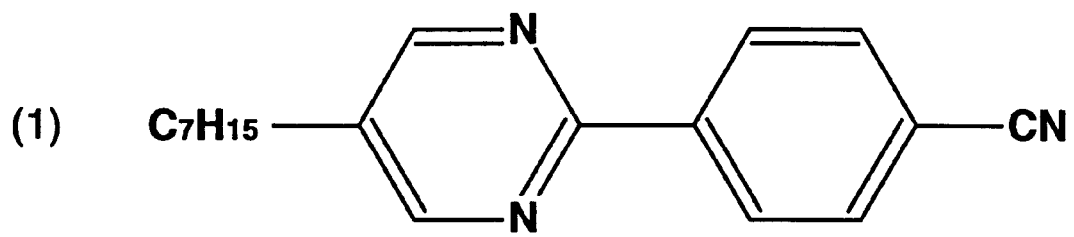
FIG. 3 shows the structural formulas of liquid crystal molecules capable of clathration.
Figure 3:
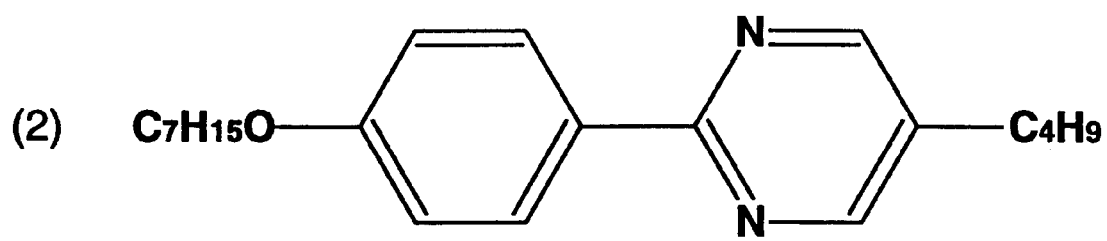
Figure 4A:
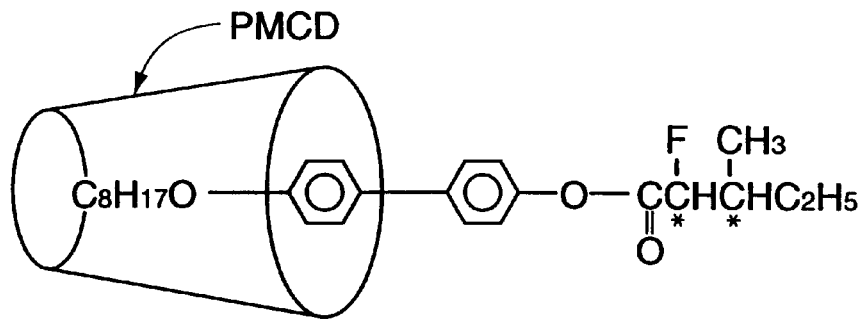
FIG. 4 is a schematic representation showing an example of the clathrate compound contained in the ferroelectric liquid crystal composition of the present invention.
Figure 5:
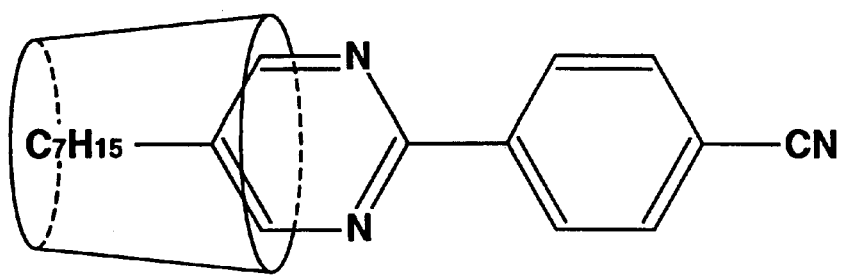
FIG. 5 is a schematic representation of another clathrate compound contained in the liquid crystal composition of the present invention.

FIG. 4A and FIG. 5 schematically show two examples of the clathrate compound pertaining to the present invention. Each consists of a chiral molecule ($C_8$LPS) or a phenylpyrimidine molecule held in the cavity of partly methylated β-cyclodextrin (PMCD). In both cases, the liquid crystal molecule should have an alkyl chain longer than PMCD (along the long axis of the molecule) and clathration should take place such that the alkyl chain projects from one opening of the clathrating lattice and the aromatic ring (or phenyl group) of the molecule overlaps at least partly with the other opening of the clathrating lattice. In this way a liquid crystal molecule and PMCD form a clathrate compound which has a low viscosity and hence moves or rotates easily as a whole at the time of switching. With an alkyl chain shorter than the clathrating lattice or with an aromatic ring not overlapping with the clathrating lattice, it is difficult to lower viscosity as desired because the liquid crystal molecule easily slips off from PMCD. A variety of clathrate compounds can be formed from chiral molecules shown in FIG. 2 and nematic liquid crystal molecules shown in FIG. 3.

The incorporation of the above-mentioned clathrate compound results in an increase in distance between liquid crystal molecules (especially distance between the liquid crystal molecule and the clathrate compound) and hence an increase in the free volume of molecules and a decrease in viscosity (at the time of switching). It also reduces the temperature dependence of the characteristic properties.

Figure 4B:
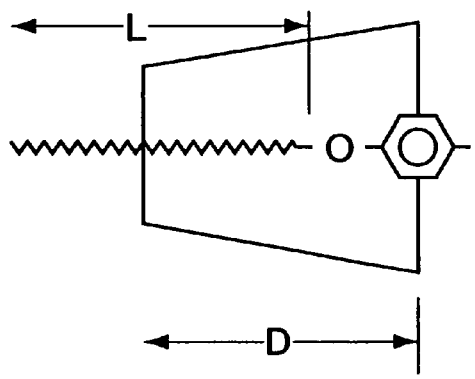

The clathrate compound should be composed of cyclodextrin (as host) and a liquid crystal molecule such as a chiral molecule (as guest) in a molar ratio of from 1:1 to 2:1. Examples with a molar ratio of 1:1 are shown in FIGS. 4 and 5. Those with a molar ratio of 2:1 are feasible when the liquid crystal molecule has a terminal alkyl chain which is longer than the remainder.

The clathrate compound mentioned above is used to form the ferroelectric liquid crystal composition of the present invention by mixing with achiral molecules (1) and/or (2) as shown in FIG. 6. It is also used to form the twist nematic liquid crystal composition of the present invention by mixing with a base material which undergoes phase transition as shown in FIG. 7.

The liquid crystal composition of the present invention should contain the clathrate compound in an amount of 0.1–50 wt %, preferably 2–30 wt %. With an amount less than 0.1 wt %, the clathrate compound does not produce its effect of increasing the free volume of the molecule. (In the case of FLC, this implies weak spontaneous polarization and low response speeds.) With an amount in excess of 50 wt %, the clathrate compound has an adverse effect on the inherent performance of the liquid crystal composition, resulting in a narrow operating temperature range. The liquid crystal compound containing the clathrate compound in a preferred amount (2–30 wt %) has a response time which is shorter by 10% or more than that without the clathrate compound under the same condition. However, the clathrate compound in excess of 30 wt % lowers the contrast.

Presumably, the above-mentioned clathrate compound is easily formed because of the partial methylation of cyclodextrin which decreases the number of hydroxyl groups. The same function as partial methylation may be obtained by the introduction into the cavity of cyclodextrin functional groups compatible with liquid crystal molecules. The same procedure as mentioned above may be used to form clathrate compounds of achiral molecules.

The above-mentioned clathrate compound may be formed from not only cyclodextrin and derivatives thereof (mentioned above) but also a variety of substances.

FIG. 2 shows some examples of chiral smectic FLC molecules. They are characterized by having two asymmetric carbon atoms and polar groups (such as carbonyl groups responsible for spontaneous polarization) at one side (right side in FIG. 2) of the aromatic groups constituting the core and also having alkoxyl groups at the other side of the aromatic groups.

These FLC molecules are those of aromatic compounds (or biphenyls such as $C_8LPS$, $C_{10}LPS$, $C_{10}F$, and $C_{12}LPS$) in which the aromatic groups are connected to each other directly or those of aromatic compounds (or esters such as FPB, FFBB, and FNB) in which the aromatic groups are connected to each other through an ester linkage. In the present invention, they may be used alone or in combination with one another. Any other known chiral molecules may also be used.

For the FLC molecules to fully exhibit their effect in the present invention, it is desirable to introduce fluorine atoms into the core, thereby preventing them from taking on other high-order smectic phases than smectic A phase and smectic C phase and also increasing the spontaneous polarization due to dipoles (or carbonyl groups in this case).

FIG. 6 shows achiral molecules (phenylpyrimidine compounds) to be mixed with the above-mentioned chiral molecules. In addition to them, phenylpyridine compounds and phenylbenzoate compounds can also be used.

Despite the absence of asymmetric carbons, these achiral molecules offer upon mixing with chiral molecules the desired ferroelectric liquid crystal composition having a high response speed. Such achiral molecules are composed of a core (consisting of a phenyl group and a pyrimidine group) and alkyl chains attached to both ends thereof.

Figure 8:
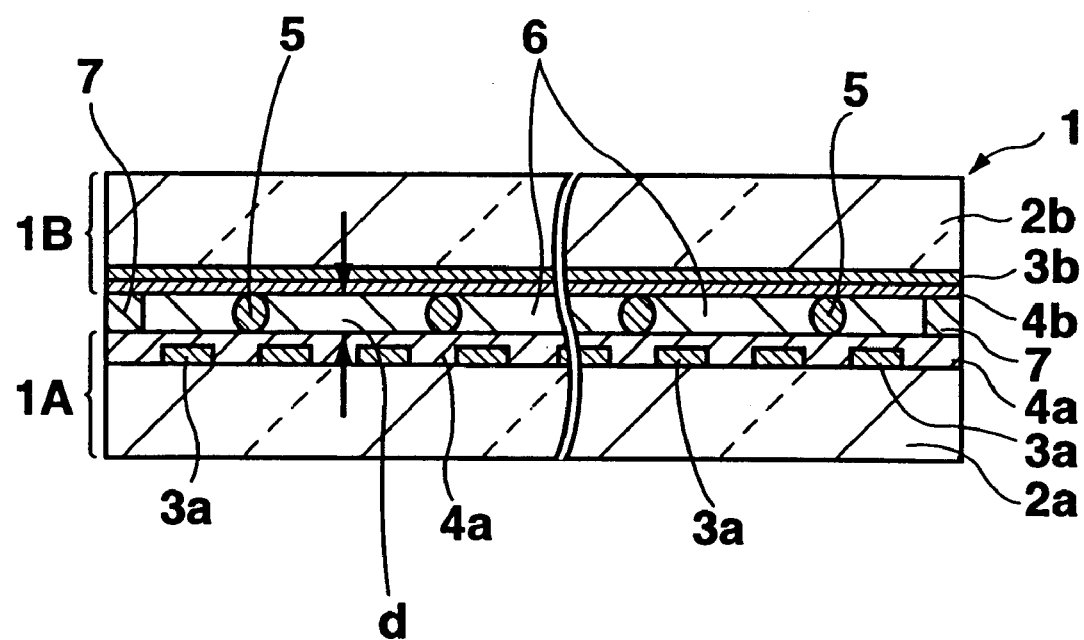
FIG. 8 is a schematic sectional view of one liquid crystal display element that employs the ferroelectric liquid crystal composition.

FIG. 8 shows a ferroelectric liquid crystal display element of simple matrix drive type which is made with the ferroelectric liquid crystal composition of the present invention. The display element 1 contains the ferroelectric liquid crystal composition 6 in the liquid crystal cell formed between two opposing plates (laminates 1A and 1B), with their periphery sealed by an adhesive 7. The first laminate 1A is composed of a transparent substrate 2a (such as a glass plate), a transparent electrode layer 3a (such as ITO which is an electrically conductive oxide of tin-doped indium), and an obliquely evaporated SiO layer 4a as an alignment layer to produce a high contrast. Similarly, the second laminate 1B is composed of a substrate 2b, a transparent electrode layer 3b, and an alignment layer 4b. The cell gap d is ensured by interposing particulate spacers 5 between the two laminates.

Figure 9:
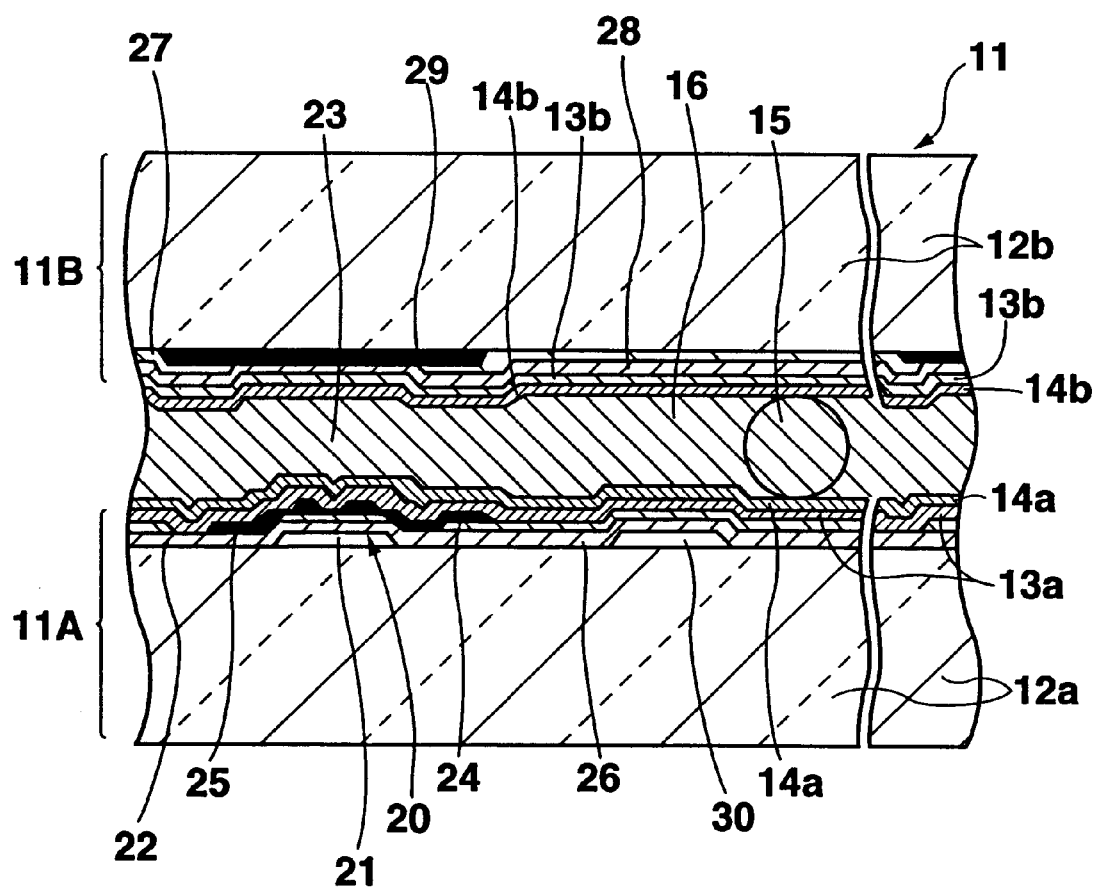
FIG. 9 is a schematic sectional view of another liquid crystal display element that employs the ferroelectric liquid crystal composition.

FIG. 9 shows a twisted nematic liquid crystal display element of active matrix drive type which is made with the liquid crystal composition of the present invention. The display element 11 contains the liquid crystal composition 16 in the liquid crystal cell formed between two opposing plates (laminates 11B and 11A), with their periphery sealed by an adhesive (not shown). The first laminate 11B is composed of a transparent substrate 12b (such as a glass plate), a transparent electrode layer 13b (such as ITO which is an electrically conductive oxide of tin-doped indium), and a polyimide layer 14b with rubbing for alignment of liquid crystal molecules. Similarly, the second laminate 11A is composed of a substrate 12a, a transparent electrode layer 13a, a polyimide layer 14a with rubbing for alignment, and a thin film transistor (TFT) 20 for each pixel. The prescribed cell gap is ensured by interposing particulate spacers 15 between the two laminates.

The TFT 20 is made up of a gate electrode 21, a gate insulating film 22, an amorphous silicon layer 23, a source region 24, and a drain region 25, and is connected to the transparent electrode layer 13a of each pixel. There is formed an insulating film 26 for passivation between the transistor 20 and the alignment layer 14a. (A storage capacitor is indicated by 30.) The substrate 12a has an insulating film 27 for passivation, a color filter layer 28, and a black matrix 29, which are formed between the substrate and the transparent electrode layer 13.

EXAMPLES

The invention will be explained in more detail with reference to the following examples.

Example 1

(a) Reagents:

A ferroelectric liquid crystal was selected from chiral molecules (such as $C_8LPS$ and $C_{10}LPS$) shown in FIG. 2. It was blended with two kinds of phenylpyrimidines (1) and (2) shown in FIG. 6 so that the resulting liquid crystal takes on the smectic C* phase in the vicinity of room temperature. Partially methylated β-cyclodextrin (PMCD), commercially available from Sanraku Co., Ltd., was used as such for clathration with chiral molecules in the following manner.

(b) Synthesis:

The clathrate compound was synthesized in the usual way by dissolving $C_8LPS$ or $C_{10}LPS$ (as a chiral molecule) and PMCD (partially methylated cyclodextrin) separately in acetone to give saturated solutions (0.01 mol/L), mixing the solutions in equal equivalent, allowing the mixture to stand at 5° C. for 24 hours for precipitation of colorless transparent needle crystals, and separating and drying the crystals.

(c) Identification:

The thus obtained clathrate compound was identified by the characteristic properties shown in Table 3. The shift in IR spectrum that occurs as the result of clathration indicates the engagement of the phenyl rings with the clathrate lattice.

TABLE 3

| | Chiral molecules without clathration | | Chiral molecules with clathration |
|---|---|---|---|
| m.p. | | → | ΔT = 2° C. |
| IR | 1013.1 cm$^{-1}$ (phenyl ring) | → | 1012.6 cm$^{-1}$ (phenyl ring) |
| | 1500 cm$^{-1}$ (phenyl ring, singlet) | → | 1500 cm$^{-1}$ (phenyl ring, doublet) |
| NMR | 1.79 ppm | → | 1.78 ppm |
| | 1.77 ppm | → | 1.76 ppm |

(d) Blending:

Phenylpyrimidine (a mixture of two species (1) and (2) shown in FIG. 6) was incorporated so that the resulting mixture contains the chiral molecules with clathration or the chiral molecules without clathration in an amount of 5 wt %. In this way there was obtained the desired ferroelectric liquid crystal composition.

The liquid crystal composition of three-component system (containing $C_{10}$LPS as the chiral molecule) undergoes phase transition at phase transition temperatures as shown in FIG. 10. It is noted that the system with clathration undergoes phase transition in the same manner as the system without clathration. The phase transition is indicated by Iso (liquid phase)→N* (chiral nematic phase)→SmA (smectic A phase)→SmC* (chiral smectic C phase)→Cr (crystalline phase). Therefore, it apparently meets the requirements of the ferroelectric liquid crystal composition.

(e) Evaluation of the device:

A ferroelectric liquid crystal element was prepared as specified below.

Cell gap: 1.6 μm

ITO electrode: 50 nm thick, 100Ω of sheet resistivity, formed by sputtering on a transparent substrate, at a deposition rate of 5 Å/sec.

SiO alignment layer: 600 Å thick, formed by oblique evaporation using a known apparatus (EBX-14D), in the antiparallel direction at an angle of 85° with respect to the normal of the substrate so as to ensure the inclined bookshelf structure. (The layer thickness was controlled by means of a quartz film thickness monitor.)

The ferroelectric liquid crystal display element prepared as mentioned above was tested for performance in the following manner.

(1) Temperature dependence of latching pulse

A ferroelectric liquid crystal is characterized by the bistable mode which appears in a reduced cell gap in the process of helix unwinding as the result of its action on the substrate surface. This mode produces the memory effect so long as the product of voltage and pulse width remains almost constant. The minimum pulse width required for this memory effect is called latching pulse width.

Figure 11:
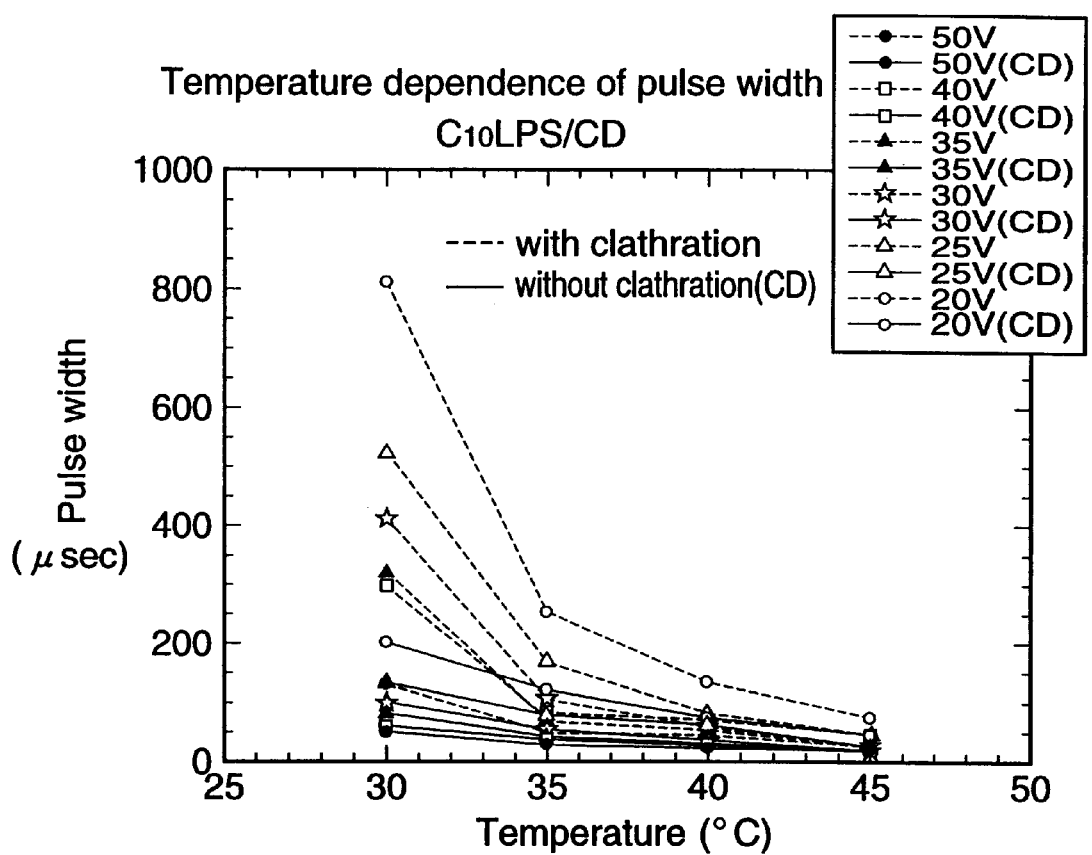
FIG. 11 is a graph showing the temperature dependence of the latching pulse width of the device employing the ferroelectric liquid crystal composition.
Figure 12:
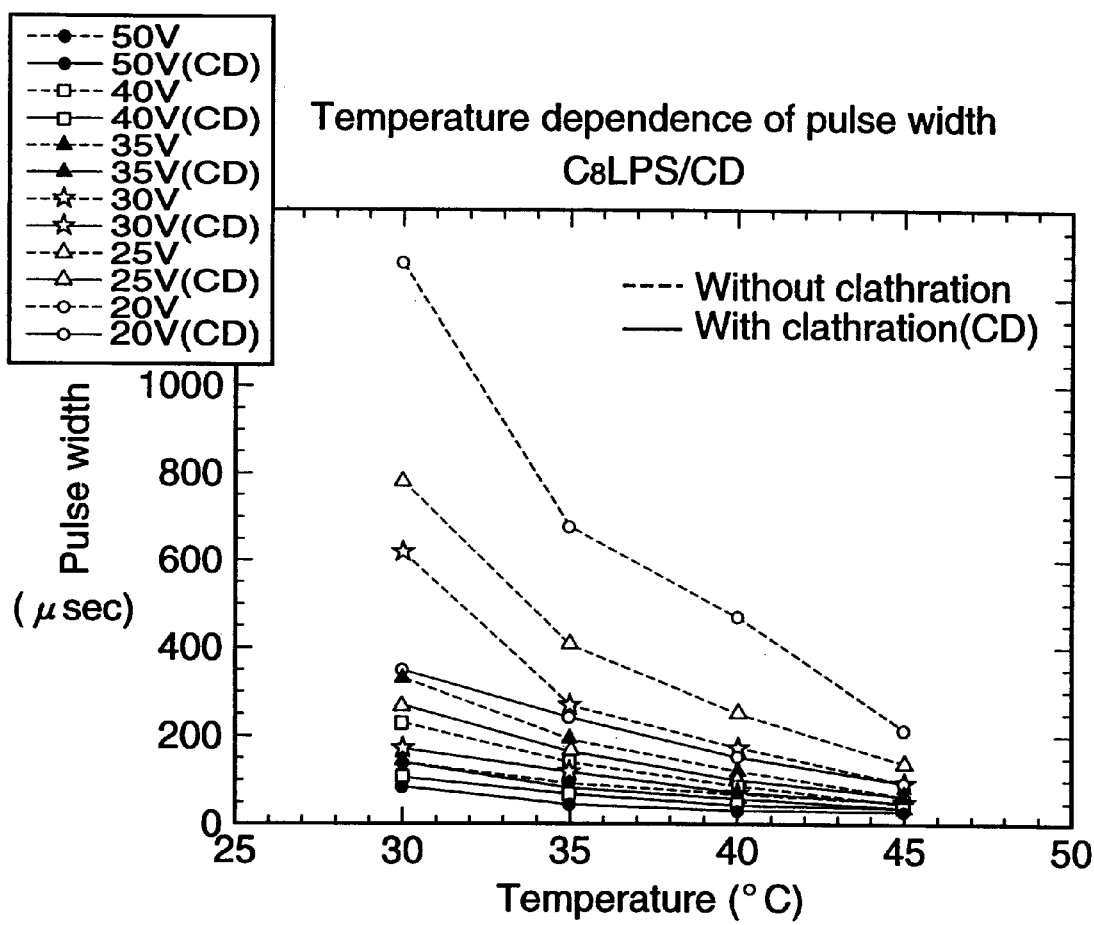
FIG. 12 is a graph showing the temperature dependence of the latching pulse width of the device employing the ferroelectric liquid crystal composition of another type.

FIGS. 11 and 12 show how $C_{10}$LPS and $C_8$LPS respectively vary in the temperature dependence of latching pulse width at different voltages depending on whether they are clathrated or not.

In both figures, broken lines denote conventional samples without clathration, and solid lines denote chiral molecules with clathration according to the present invention. It is noted that clathration reduces the latching pulse width at the same voltage applied. The gentler the slope of lines, the smaller the temperature dependence. Therefore, it is apparent that clathration reduces the temperature dependence of both $C_{10}$LPS and $C_8$LPS.

The same result as mentioned above will be obtained if spontaneous polarization depends greatly on temperature in view of the equation of latching pulse below.

$$\tau = \eta/Ps \cdot E$$

where τ is the response time (equivalent to the latching pulse width), η is the viscosity of the material, Ps is the spontaneous polarization, and E is the electric field.

Figure 13:
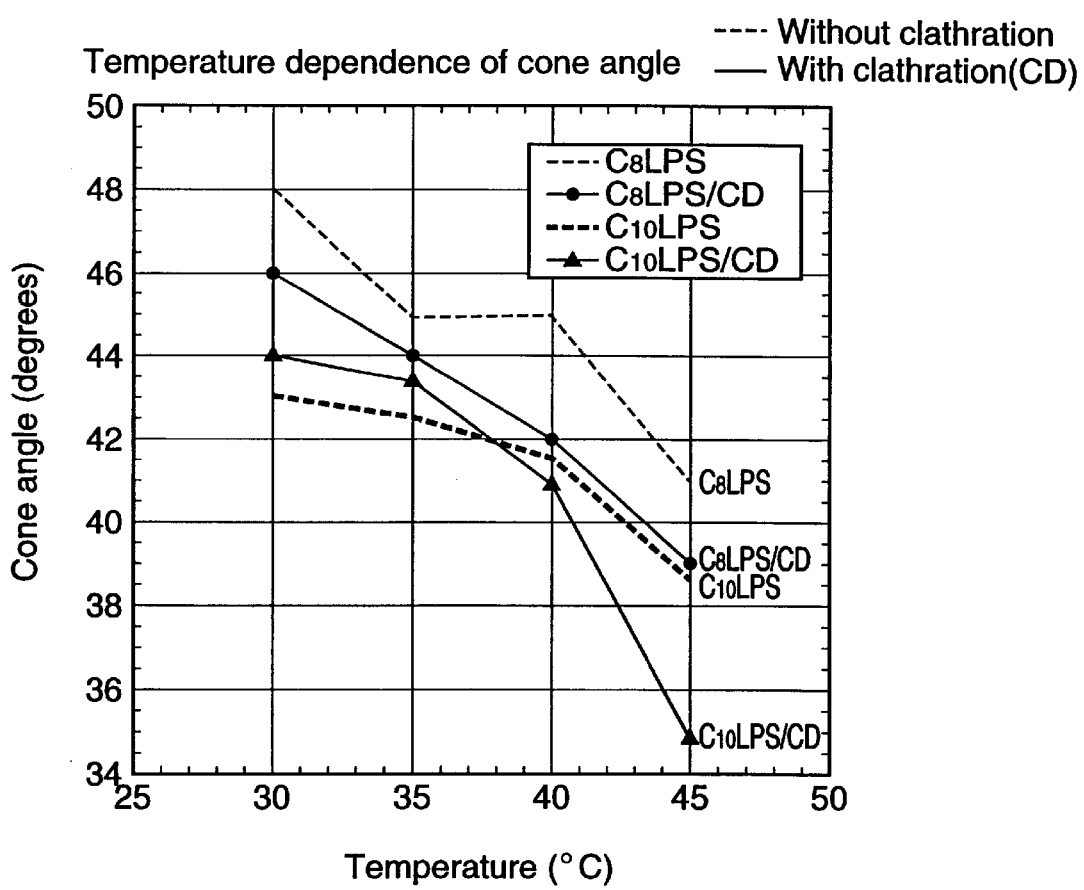
FIG. 13 is a graph showing the temperature dependence of the cone angle of the chiral molecule in the ferroelectric liquid crystal composition.

Presumably, the effect of decreasing the temperature dependence (shown in FIGS. 11 and 12) which is produced by clathration is due mostly to decrease in the change of viscosity with temperature, as is concluded from the fact that the cone angle of chiral molecules changes with temperature (as shown in FIG. 13) but this change is not so great as to support the results shown in FIGS. 11 and 12 (which implies that the temperature dependence of layer slope angle is not so great as to greatly change the spontaneous polarization).

The decrease in viscosity or the decrease in temperature dependence of viscosity due to clathration may be ascribed to the increase in free volume and the ensuing decrease in intermolecular actions (or decrease in thermal influence of a molecule on its adjacent one). The relation between viscosity and free volume is represented by the equation below (J. Appl. Phys. 22 (1951) 1471, 23 (1952) 236).

$$\log\eta = \log A + B(V_o/V_f)$$

where A and B are constants for individual liquids, $V_o$ is the volume a molecule occupies, and $V_f$ is the free volume.

(2) Temperature dependence of threshold voltage

The ferroelectric liquid crystal has no established formula for threshold voltage unlike TN liquid crystal. The threshold voltage is a function of viscosity and voltage and hence it depends greatly on temperature as in the case of latching pulse width.

Figure 14:
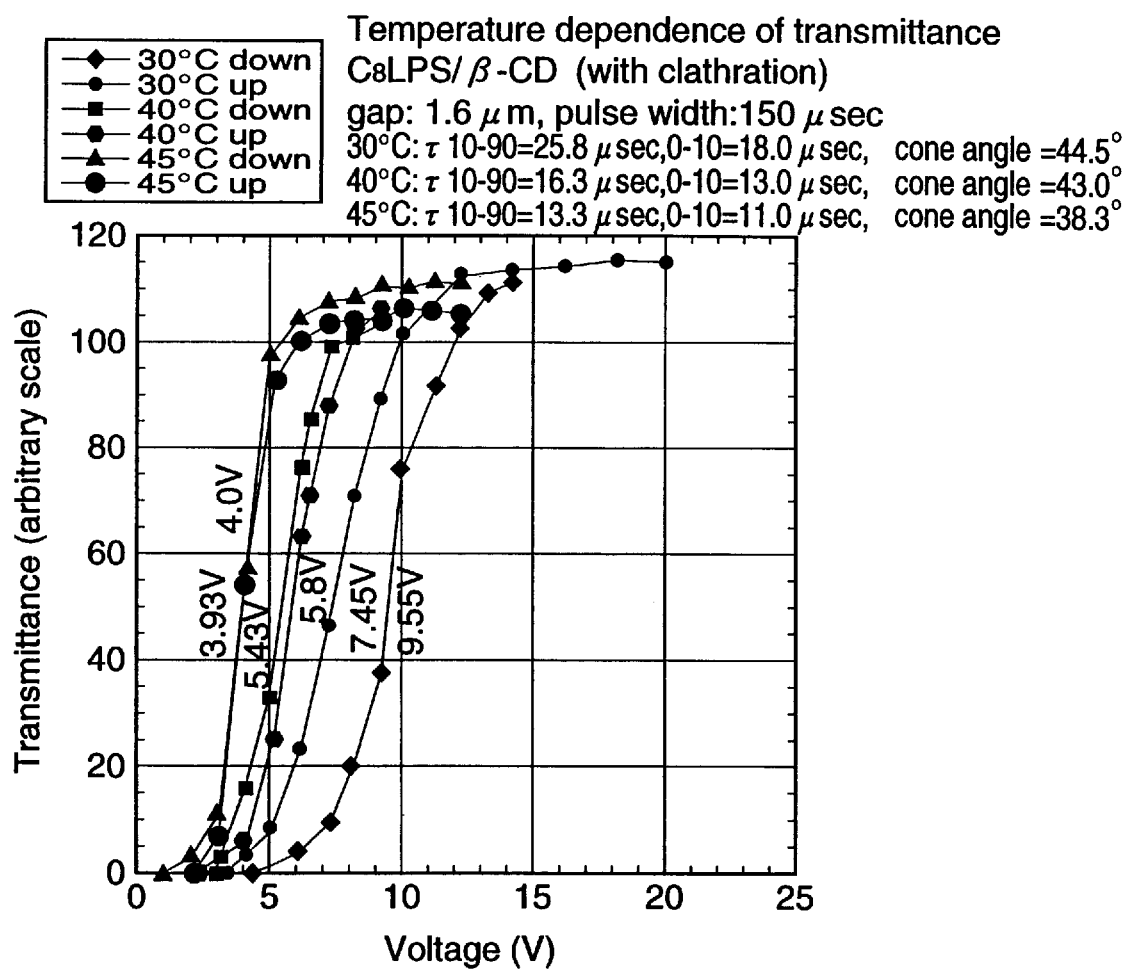
FIG. 14 is a graph showing the voltage dependence of the light transmittance of the device employing the ferroelectric liquid crystal composition of the present invention.
Figure 15:
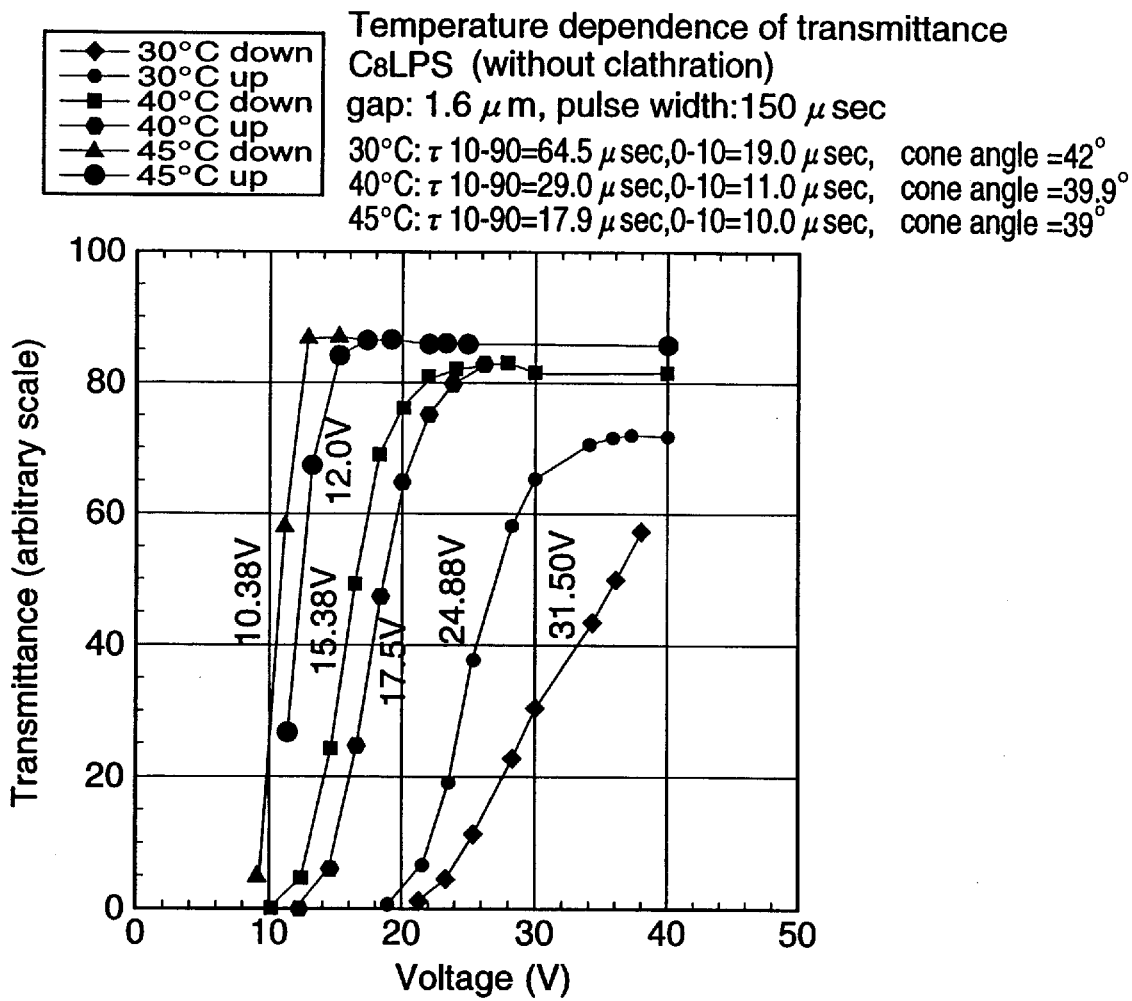
FIG. 15 is a graph showing the voltage dependence of the light transmittance of the device employing a conventional ferroelectric liquid crystal composition.

FIG. 14 shows the threshold voltage for chiral molecules ($C_8$LPS) clathrated with PMCD, and FIG. 15 shows the threshold voltage for chiral molecules ($C_8$LPS) without clathration as in the conventional technology. In these figures, "10–90" means the change in transmittance over the range from 10% to 90%, and "0–10" means the change in transmittance over the range from 0% to 10%.

The voltage-transmittance curves at 30° C., 40° C., and 45° C. suggest that clathration apparently lowers the threshold voltage and also decreases hysteresis (or temperature drift). This means that clathration permits the desired response time (τ) to be achieved at a lower voltage while improving contrast.

The stabilized threshold voltage for the liquid crystal with clathration is presumably due to the fact that cyclodextrin completely or largely prevents the alkyl chain of one chiral molecule from entangling with that of adjacent one, so that the chiral molecules rotate comparatively freely, as suggested by the schematic in FIG. 4.

Figure 16:
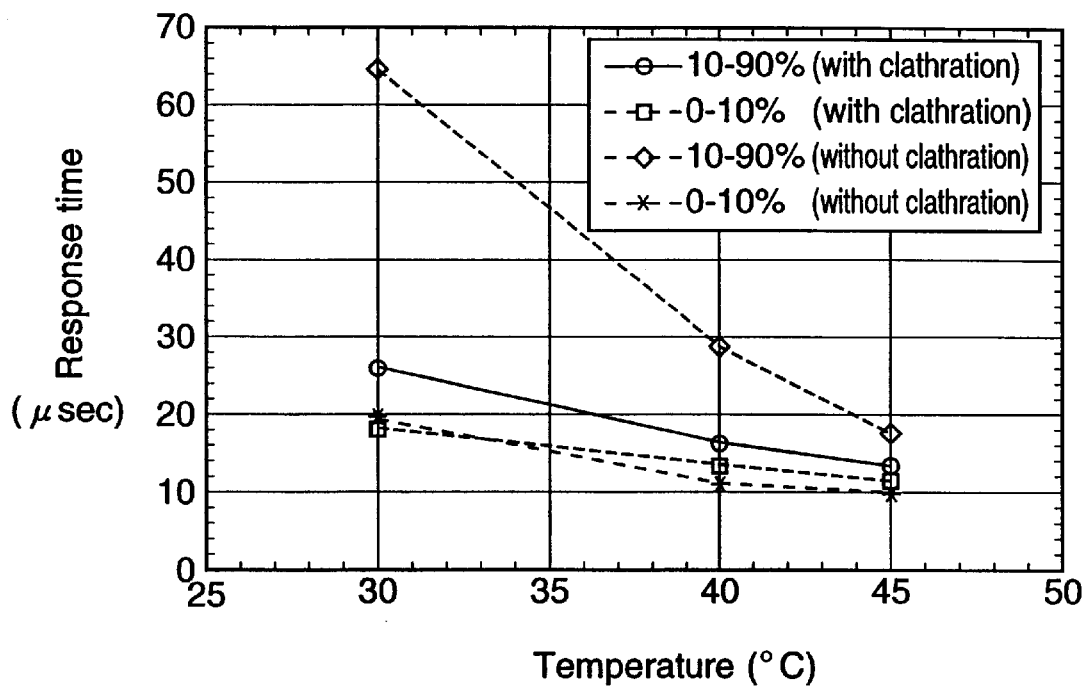
FIG. 16 is a graph showing the temperature dependence of the response time of the device employing the ferroelectric liquid crystal composition.

It is noted from FIG. 16 that the liquid crystal does not change significantly in the response time (τ), regardless of clathration, in the region where transmittance changes over the range from 0% to 10%, whereas this is not the case for the liquid crystal with clathration in the region where transmittance changes over the range from 10% to 90%. That is, the response time is remarkably short and stable to temperature change. The former case implies that the response time is affected by the anchoring on the substrate surface and the dielectric anisotropy of the molecule, whereas the latter case implies that the response time is greatly affected by viscosity. In other words, the response is improved if viscosity is reduced by clathration.

(3) Effect of stabilizing bias voltage

It was confirmed that the clathrate compound contributes to stabilizing the bias voltage in non-selective state (which is inevitable in simple matrix drive), as shown in Table 4 below.

TABLE 4

Effect of stabilizing bias voltage

|  | $C_8LPS$ | $C_8LPS/CD$ | $C_{10}LPS$ | $C_{10}LPS/CD$ |
|---|---|---|---|---|
| Contrast without bias | 57.6 | 37 | 32 | 52 |
| Contrast with 6:1 bias | 8 | 25 | 20 | 41 |
| Ratio of bias stability | 0.139 | 0.676 | 0.625 | 0.788 |

It is noted that $C_8LPS$ with clathration only slightly decreases in contrast upon application of bias, whereas $C_8LPS$ without clathration greatly decreases in contrast upon application of bias although the initial value of contrast in the former case is lower than that in the latter case. This suggests that clathration greatly contributes to stability.

The samples were also tested for hysteresis. "Hysteresis" is defined as a phenomenon that the transmittance changes depending on how the electric field has been applied. It usually manifests itself as sticking. To measure hysteresis, the transmittance was plotted against the increasing voltage and decreasing voltage, as shown in FIGS. 14 and 15, and hysteresis was expressed in terms of voltage difference at the 50% transmittance. The results are shown in Table 5.

TABLE 5

Effect of decreasing hysteresis

| Temperature at which measurements were carried out | Hysteresis of $C_8LPS$ without clathration | Hysteresis of $C_8LPS$ with clathration |
|---|---|---|
| 30° C. | 6.62 V | 2.10 V |
| 40° C. | 2.12 V | 0.37 V |
| 45° C. | 1.62 V | 0.07 V |

It is apparent from Table 5 that the hysteresis width is narrower in the case of clathrate compound.

It is concluded from the foregoing that clathration increases the free volume of liquid crystal molecules, which contributes to greater response speed, lower temperature dependence, less hysteresis (sticking), and higher contrast.

Figure 17:
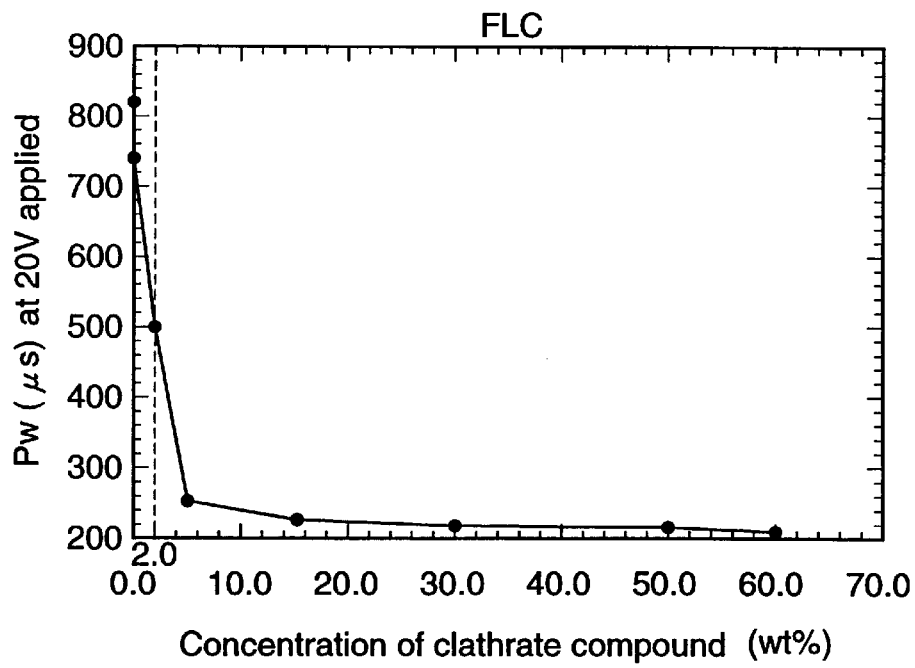
FIG. 17 is a graph showing the change in latching pulse width that depends on the amount of the clathrate compound in the same ferroelectric liquid crystal composition as in FIG. 16.
Figure 18:
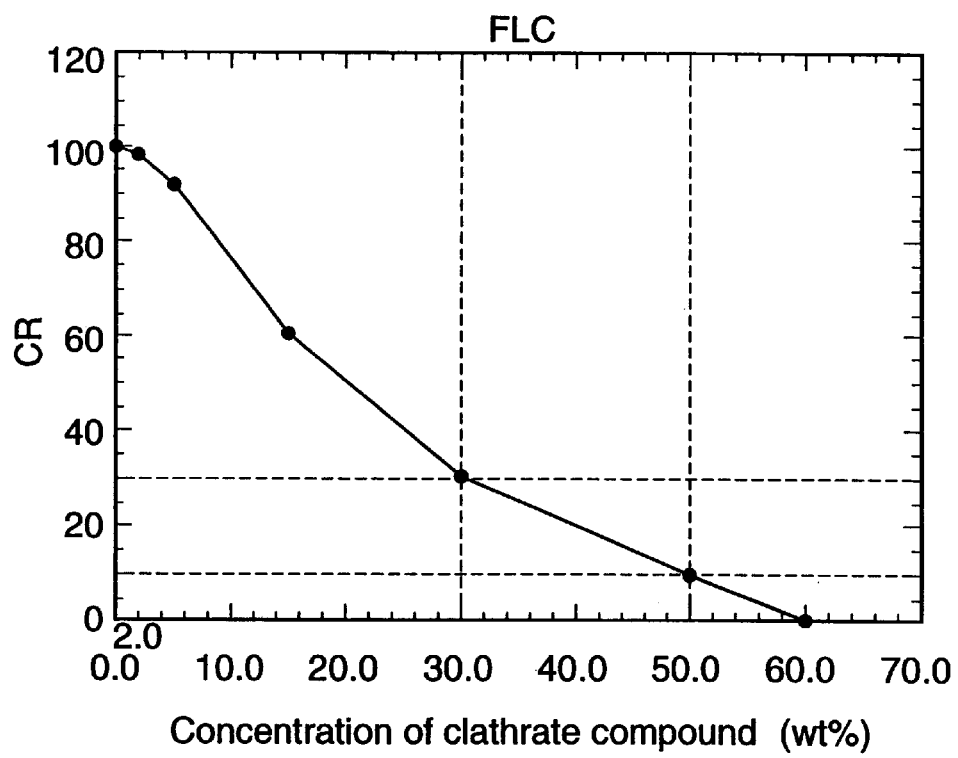
FIG. 18 is a graph showing the change in contrast that depends on the amount of the clathrate compound in the same ferroelectric liquid crystal composition as in FIG. 16.

It was found that the latching pulse width and the contrast vary depending on the amount of clathrated FLC molecules ($C_8LPS$) added to the base liquid crystal, as shown in FIGS. 17 and 18, respectively.

It is noted from FIG. 17 that the clathrate compound does not fully produce its effect (of increasing the free volume of molecules), with the result that the latching pulse width tends to be large, if its amount added to the base material is less than 0.1 wt %. When the amount of the clathrate compound was 0.1 wt %, the resulting liquid crystal composition decreased in pulse width from 820 μsec to 740 μsec. As the amount of the clathrate compound was increased up to 2 wt %, the resulting liquid crystal composition greatly decreased in pulse width by about 40% (from 820 μsec to 500 μsec). That this improvement can be achieved without requiring any special materials and without adversely affecting other characteristic properties (such as temperature characteristics) is of practical advantage.

When the amount of the clathrate compound exceeds 50 wt %, the resulting liquid crystal composition greatly decreases in contrast (CR) to 10:1 or less, as shown in FIG. 18. In other words, the liquid crystal composition loses FLC's inherent performance and has a narrow operating temperature range. When the amount of the clathrate compound is less than 50 wt %, the contrast is higher than 10:1; especially when the amount of the clathrate compound is less than 30 wt %, the contrast is higher than 30:1.

It is concluded from the foregoing results that the amount of the clathrate compound should be 0.1–50 wt %, preferably 2–30 wt %, for high-speed operation and high contrast.

Example 2

(a) Reagents:

A liquid crystal was selected from those shown in FIG. 3. It was blended with a known cyano compound and fluorine compound (as the base liquid crystal) so as to increase the dielectric anisotropy. Partially methylated β-cyclodextrin (PMCD), commercially available from Sanraku Co., Ltd., was used as such for clathration with liquid crystal molecules in the following manner.

(b) Synthesis:

The clathrate compound was synthesized in the usual way by dissolving phenylpyrimidine liquid crystal (1) or (2) shown in FIG. 3 and PMCD (partially methylated cyclodextrin) separately in acetone to give saturated solutions (0.01 mol/L), mixing the solutions in equal equivalent, allowing the mixture to stand at 5° C. for 24 hours for precipitation of colorless transparent needle crystals, and separating and drying the crystals.

(c) Identification:

The thus obtained clathrate compound was identified by the characteristic properties shown in Table 6 below. The slight shift in IR spectrum that occurs as the result of clathration indicates the engagement of the phenyl rings with the clathrate lattice of PMCD.

TABLE 6

|  | Liquid crystal molecules without clathration | → Liquid crystal molecules with clathration |
|---|---|---|
| m.p. |  | ΔT = 2° C. |
| IR | 1012.6 cm$^{-1}$ (phenyl ring) | → 1011.9 cm$^{-1}$ (phenyl ring) |
|  | 1498 cm$^{-1}$ (phenyl ring, singlet) | → 1498.0 cm$^{-1}$ (phenyl ring, doublet) |

(d) Blending:

To prepare a liquid crystal composition, a base liquid crystal (having the phase transition temperature as shown in Table 7 below) was incorporated with the liquid crystal, with or without clathration, in an amount of 5 wt %.

TABLE 7

| Smectic phase | → | Nematic phase | → | Isotropic |
|---|---|---|---|---|

TABLE 7-continued

| Phase transition temperature | 40° C. | 120° C. |
|---|---|---|

The resulting three-component liquid crystal composition based on phenylpyrimidine (1) undergoes phase transition at the phase transition temperature as shown in FIG. 7. It is noted that the clathrated liquid crystal undergoes the same phase transition (Iso (liquid phase)→N (nematic phase)→Cr (crystalline phase)) as the unclathrated liquid crystal. This suggests that the clathrated liquid crystal possesses the physical properties required of nematic liquid crystal compositions.

Figure 19:
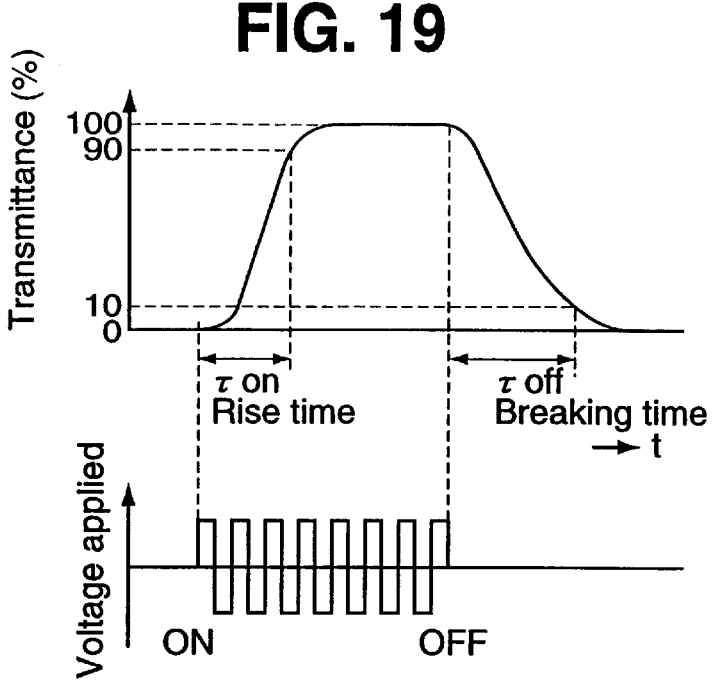
FIG. 19 is a schematic drawing showing the drive waveform used to evaluate the device that employs another liquid crystal composition and the change in transmittance that depends on the drive waveform.

(e) Evaluation of the device:

A liquid crystal element was prepared as specified below.
Cell gap: 3.5 μm
ITO electrode: 50 nm thick, 100Ω of sheet resistivity, formed by sputtering on a transparent substrate.
Alignment layer: formed from polyimide (AL1524H containing 19 wt % solids, from Japan Synthetic Rubber Co., Ltd.) by spin coating at 1000 rpm for 4 seconds and at 3500 rpm for 30 seconds to give an 80 nm thick film. The spin-coated film was baked at 50° C. for 20 minutes and at 180° C. for 120 minutes.
Rubbing: The baked polyimide film was rubbed once under the following conditions.
  Pushing depth: 0.12 mm
  Roller speed: 94 rpm
  Stage speed: 25×2 mm/min
The liquid crystal element prepared as mentioned above was tested for response speed by applying voltage at 70° C. as shown in FIG. 19. The results are shown in Table 8 below. It is noted that the liquid crystal element containing the clathrate compound is greatly improved in response speed.

TABLE 8

| Liquid crystal molecule added (5 wt %) | System without clathration | System with clathration |
|---|---|---|
| (1) in FIG. 3 | Rise time, 30 ms | Rise time, 20 ms |
|  | Breaking time, 36 ms | Breaking time, 24 ms |
| (2) in FIG. 3 | Rise time, 30 ms | Rise time, 14 ms |
|  | Breaking time, 36 ms | Breaking time, 17 ms |

The decrease in viscosity or the decrease in temperature dependence of viscosity due to clathration may be ascribed to the increase in free volume and the ensuing decrease in intermolecular actions (or decrease in thermal influence of a molecule on its adjacent one). The relation between viscosity and free volume is reported in the above-cited literature.

Several samples of liquid crystal compositions were prepared by incorporating the base liquid crystal with the clathrate compound of liquid crystal molecule (1) in varied amounts. Their test results are shown in FIG. 20 (response time) and FIG. 21 (contrast).

Figure 20:
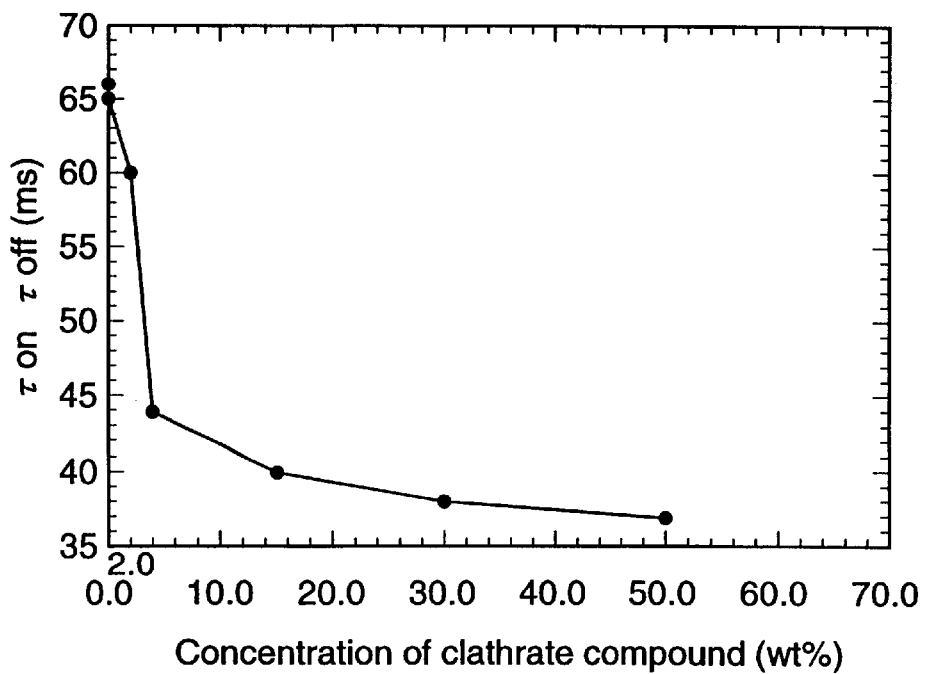
FIG. 20 is a graph showing the change in response time that depends on the amount of the clathrate compound in the same liquid crystal composition as in FIG. 19.

It is noted from FIG. 20 that the clathrate compound in an amount less than 0.1 wt % does not fully produce the effect of increasing the free volume of molecules, with the result that the response speed (τon+τoff) is slow. By contrast, the clathrate compound in an amount of 0.1 wt % increases the response speed from 66 ms to 65 ms. As the amount of the clathrate compound increases from 0.1 wt % to 2 wt %, the response speed increases (by about 10%) from 66 ms to 60 ms. That this improvement can be achieved without requiring any special materials and without adversely affecting other characteristic properties (such as temperature characteristics) is of practical advantage.

Figure 21:
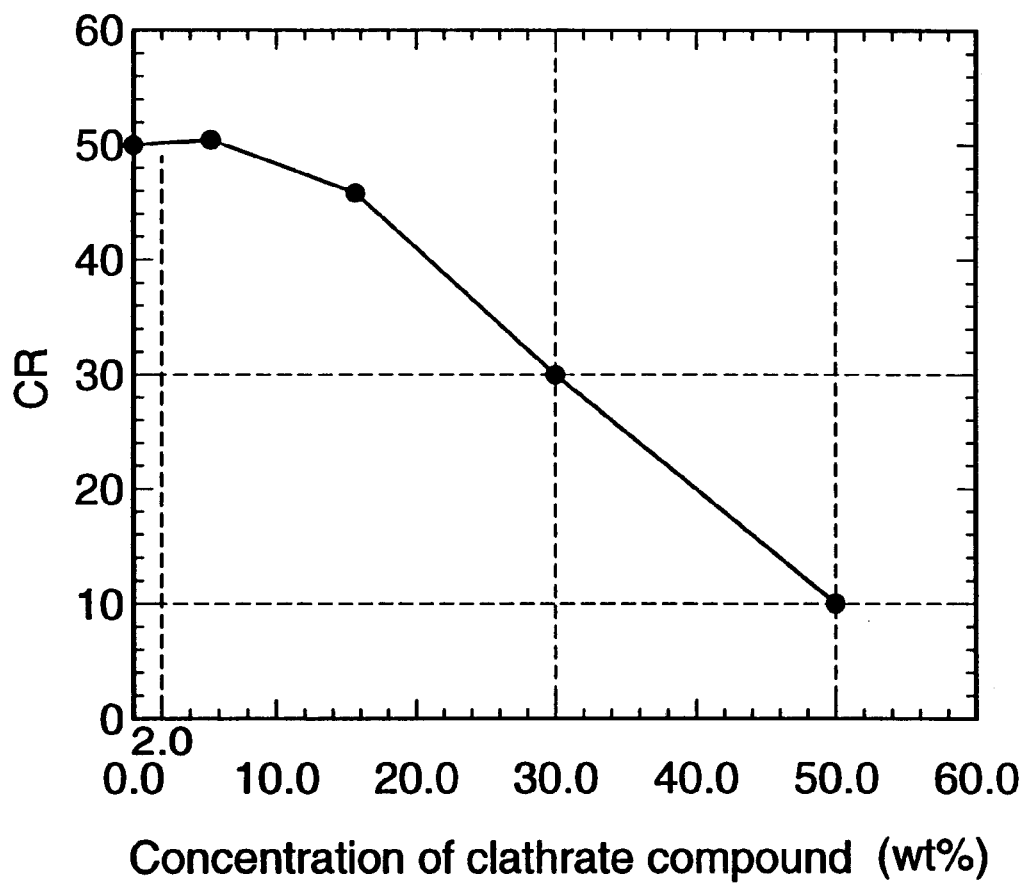
FIG. 21 is a graph showing the change in contrast that depends on the amount of the clathrate compound in the same liquid crystal composition as in FIG. 19.

When the amount of the clathrate compound exceeds 50 wt %, the resulting liquid crystal composition greatly decreases in contrast (CR) to 10:1 or less, as shown in FIG. 21. When the amount of the clathrate compound is less than 50 wt %, the contrast is higher than 10:1; especially when the amount of the clathrate compound is less than 30 wt %, the contrast is higher than 30:1.

It is concluded from the foregoing results that the amount of the clathrate compound should be 0.1–50 wt %, preferably 2–30 wt %, for high-speed operation and high contrast.

It is to be understood that the foregoing description is a preferred embodiment and various changes and modifications may be made in the invention without departing from the spirit and scope thereof.

For example, the cyclodextrin (or derivatives thereof used to form the clathrate compound may be replaced by any of crown ethers, cyclophanes, and derivatives thereof, or any other compounds that form the desired clathrate compound with the liquid crystal molecule.

The liquid crystal composition of the present invention is suitable for display units to display a large amount information densely at a high response speed. Their examples include optoelectronic devices and image processing devices such as spatial light modulators which utilize the ferroelectric liquid crystal elements.

EFFECT OF THE INVENTION

The present invention provides a liquid crystal composition which has a high response speed without any adverse effect on its inherent performance, owing to incorporation with a substance to effectively increase the free volume of the constituent molecules. The increased free volume weakens the intermolecular action, thereby decreasing the viscosity which governs the response speed of the liquid crystal.

What is claimed is:

1. A liquid crystal composition comprising:

(a) at least one chiral compound selected from the group consisting of $C_8LPS$, $C_{10}LPS$, $C_{12}LPS$, $C_{10}F$, FPB, FNB and FFBB;

(b) at least one achiral compound having at least one terminal alkyl group containing 7 or more carbon atoms selected from the group consisting of phenyl pyrimidine compounds, phenyl pyridine compounds, and phenyl benzoate compounds; and (c) an amount of a clathrated compound sufficient to improve a free volume of molecules of a composition comprising components (a), (b) and (c) as compared to a composition comprising components (a) and (b) without component (c), said clathrated compound being selected from the group consisting of (i) at least one clathrated chiral compound comprising a clathrated product of partially alkylated β-cyclodextrin and a chiral compound of component (a) above and (ii) at least one clathrated achiral compound comprising a clathrated product of partially alkylated β-cyclodextrin and an achiral compound of component (b) above.

2. A liquid crystal composition as defined in claim 1, wherein the partially alkylated β-cyclodextrin is a partially methylated β-cyclodextrin.

3. A liquid crystal composition as defined in claim 1, wherein the achiral compound of component (b) or (c) comprises:

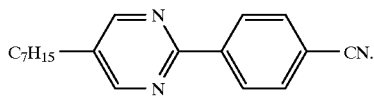

4. A liquid crystal composition as defined in claim 1, wherein the achiral compound of component (b) or (c) comprises:

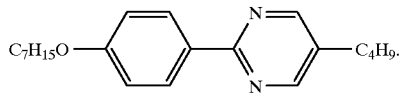

5. A liquid crystal composition as defined in claim 1, wherein the achiral compound of component (b) or (c) comprises:

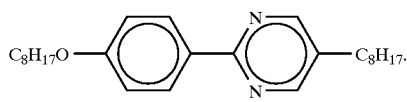

6. A liquid crystal composition as defined in claim 1, wherein the achiral compound of component (b) or (c) comprises:

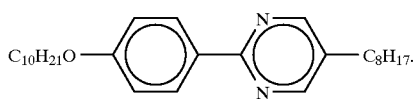

7. A liquid crystal composition as defined in claim 1, wherein the clathrated compound is present in an amount of from about 0.1 to about 50 wt %, based on the weight of the liquid crystal composition.

8. A liquid crystal composition as defined in claim 1, wherein the clathrated compound is present in an amount of from about 2 to about 30 wt %, based on the weight of the liquid crystal composition.

9. A method for making a liquid crystal composition comprising the steps of:

(a) providing a liquid crystal admixture comprising (i) at least one chiral compound selected from the group consisting of: $C_8LPS$, $C_{10}LPS$, $C_{12}LPS$, $C_{10}F$, FPB, FNB and FFBB; and (ii) at least one achiral compound having at least one terminal alkyl group containing 7 or more carbon atoms selected from the group consisting of: phenyl pyrimidine compounds, phenyl pyridine compounds, and phenyl benzoate compounds; and (b) adding from about 0.1 to about 50 wt %, based on the weight of the overall composition, of at least one clathrated compound to said liquid crystal admixture to form the liquid crystal composition, said clathrated compound being selected fro the group consisting of (i) a clathrated chiral compound comprising a clathrated product of partially alkylated β-cyclodextrin and a chiral compound of component (a) (i) above and (ii) a clathrated achiral compound comprising a clathrated product of partially alkylated β-cyclodextrin and an achiral component of component (a) (ii) above.

10. A method for making a liquid crystal composition as defined in claim 9, wherein the clathrated compound is added in an amount of 2–30 wt %, based upon the weight of the overall composition.

11. A liquid crystal element comprising:

first and second parallel spaced apart substrates, said first and second substrates each having an inner facing surface having an electrode layer disposed thereon and a liquid crystal alignment layer thereon, said first and second substrates being spaced apart so as to define a gap between opposed inner facing surfaces thereof; and a liquid crystal composition disposed in said gap, said liquid crystal composition comprising:

(a) at least one chiral compound selected from the group consisting of $C_8LPS$, $C_{10}LPS$, $C_{12}LPS$, $C_{10}F$, FPB, FNB and FFBB;

(b) at least one achiral compound having at least one terminal alkyl group containing 7 or more carbon atoms selected from the group consisting of phenyl pyrimidine compounds, phenyl pyridine compounds, and phenyl benzoate compounds; and (c) an amount of a clathrated compound sufficient to improve a free volume of molecules of a composition comprising components (a), (b) and (c) as compared to a composition comprising components (a) and (b) without component (c), said clathrated compound being selected from the group consisting of (i) at least one clathrated chiral compound comprising a clathrated product of partially alkylated β-cyclodextrin and a chiral compound of component (a) above and (ii) at least one clathrated achiral compound comprising a clathrated product of partially alkylated β-cyclodextrin and an achiral compound of component (b) above.

12. A liquid crystal element as defined in claim 11, wherein the clathrated compound is present in an amount of from about 0.1 to about 50 wt %, based on the weight of the liquid crystal composition.

13. A liquid crystal element as defined in claim 11, wherein the clathrated compound is present in an amount of from about 2 to about 30 wt %, based on the weight of the liquid crystal composition.

* * * * *